(12) United States Patent     (10) Patent No.:   US 12,610,019 B2

Amir et al.     (45) Date of Patent:   *Apr. 21, 2026

---

(54) HALFTONE SCREENS ENCODING SIGNATURES

(71) Applicant: Hewlett-Packard Development Company, L.P., Spring, TX (US)

(72) Inventors: Gideon Amir, Ness Ziona (IL); Tadej Turk, Vienna (AT)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,449

(22) Filed: Apr. 3, 2024

(65) Prior Publication Data

US 2024/0251050 A1    Jul. 25, 2024

Related U.S. Application Data

(63) Continuation of application No. 17/792,618, filed as application No. PCT/US2020/015911 on Jan. 30, 2020, now Pat. No. 11,979,536.

(51) Int. Cl.
   *H04N 1/32*      (2006.01)
   *H04N 1/405*     (2006.01)

(52) U.S. Cl.
   CPC ..... *H04N 1/32256* (2013.01); *H04N 1/32272* (2013.01); *H04N 1/405* (2013.01); *H04N 2201/3233* (2013.01); *H04N 2201/3281* (2013.01)

(58) Field of Classification Search
   CPC ........... H04N 1/00843; H04N 1/00846; H04N 1/32101; H04N 1/40087; H04N 1/405–4058; H04N 1/52; H04N 1/32144–32352; G06K 15/1881
   See application file for complete search history.

(56) References Cited

U.S. PATENT DOCUMENTS

| | | | |
|---|---|---|---|
| 4,918,622 | A | 4/1990 | Granger et al. |
| 5,291,243 | A | 3/1994 | Heckman et al. |
| 5,309,246 | A | 5/1994 | Barry et al. |
| | | (Continued) | |

FOREIGN PATENT DOCUMENTS

| | | |
|---|---|---|
| CN | 104094285 A | 10/2014 |
| CN | 104094286 A | 10/2014 |
| | (Continued) | |

OTHER PUBLICATIONS

Baharav, Zachi Z., and Doron Shaked. "Watermarking of dither halftoned images." Security and Watermarking of Multimedia Contents. vol. 3657. SPIE (Year: 1999).*

*Primary Examiner* — Scott A Rogers
(74) *Attorney, Agent, or Firm* — Jordan IP Law, LLC

(57) ABSTRACT

In an example, a method includes, at least one processor, in response to each of a plurality of requests, determining a halftone screen. Determining the halftone screen comprises encoding a signature pattern in the halftone screen, and halftone screens for different requests may be encoded with a different signature pattern. The halftone screen may be arranged such that, when applied to image data to provide a printed output, the pattern is discernible therein to provide a signature for the printed output.

18 Claims, 4 Drawing Sheets

(56)         References Cited

U.S. PATENT DOCUMENTS

| | | | |
|---|---|---|---|
| 5,734,752 | A | 3/1998 | Knox |
| 5,790,703 | A | 8/1998 | Wang |
| 6,047,374 | A | 4/2000 | Barton |
| 6,252,971 | B1 | 6/2001 | Wang |
| 6,356,363 | B1 * | 3/2002 | Cooper .................. G06K 15/00 |
| | | | 358/1.9 |
| 6,526,155 | B1 | 2/2003 | Wang et al. |
| 6,694,041 | B1 | 2/2004 | Brunk |
| 6,731,409 | B2 | 5/2004 | Wang |
| 7,006,256 | B2 | 2/2006 | Wang et al. |
| 7,086,666 | B2 | 8/2006 | Richardson |
| 7,286,682 | B1 | 10/2007 | Sharma et al. |
| 7,286,685 | B2 * | 10/2007 | Brunk ............... H04N 21/8358 |
| | | | 358/534 |
| 7,352,879 | B2 | 4/2008 | Wang |
| 7,394,573 | B1 | 7/2008 | Goldberg et al. |
| 7,436,977 | B2 * | 10/2008 | Wang ................... G06T 1/0078 |
| | | | 382/172 |
| 7,719,733 | B2 | 5/2010 | Schilling et al. |
| 7,952,767 | B2 * | 5/2011 | Sharma ............. H04N 1/32256 |
| | | | 358/3.06 |
| 8,171,567 | B1 | 5/2012 | Fraser et al. |
| 9,361,514 | B2 | 6/2016 | Pollard et al. |
| 9,373,032 | B2 | 6/2016 | Ulichney et al. |
| 11,446,949 | B1 | 9/2022 | Buentello et al. |
| 2003/0112471 | A1 | 6/2003 | Damera-Venkata et al. |
| 2003/0197878 | A1 | 10/2003 | Metois et al. |
| 2004/0153653 | A1 | 8/2004 | Abhyankar et al. |
| 2004/0258273 | A1 | 12/2004 | Brunk |
| 2006/0165255 | A1 | 7/2006 | Wang et al. |
| 2008/0019559 | A1 | 1/2008 | Wang et al. |
| 2014/0160532 | A1 | 6/2014 | Mori |
| 2016/0188938 | A1 | 6/2016 | Summerfield |
| 2016/0307036 | A1 | 10/2016 | Ulicheny et al. |
| 2023/0039819 | A1 | 2/2023 | Amir |
| 2023/0069685 | A1 | 3/2023 | Amir |
| 2024/0064260 | A1 * | 2/2024 | Frank .................. H04N 1/4055 |

FOREIGN PATENT DOCUMENTS

| | | | |
|---|---|---|---|
| CN | 105637535 | A | 6/2016 |
| CN | 107644391 | A | 1/2018 |
| DE | 68928366 | T2 | 4/1998 |
| EP | 0533593 | A2 | 3/1993 |
| EP | 1445680 | A2 | 8/2004 |
| JP | 09-109543 | A | 4/1997 |
| JP | 2005-204106 | A | 7/2005 |
| JP | 2006-211658 | A | 8/2006 |
| JP | 2015-106877 | A | 6/2015 |
| JP | 2017-217756 | A | 12/2017 |
| KR | 10-0541273 | B1 | 1/2006 |
| WO | 2005/109311 | A2 | 11/2005 |
| WO | 2013/119234 | A1 | 8/2013 |
| WO | 2019/076469 | A1 | 4/2019 |
| WO | 2022/173435 | A1 | 8/2022 |

* cited by examiner

| Determine greyscale image of signature pattern | 302 |
| --- | --- |
| Store indication of pattern | 304 |
| Determine halftone thresholds from greyscale image | 306 |
| Transmit halftone screen to entity | 308 |

HALFTONE SCREENS ENCODING SIGNATURES

CROSS-REFERENCE TO RELATED APPLICATIONS

The present application is a continuation of U.S. patent application Ser. No. 17/792,618 (filed on Jul. 13, 2022), which is a National Stage Entry of PCT/US2020/015911 (filed Jan. 30, 2020), all of which are hereby incorporated by reference in their entirety.

BACKGROUND

Printing systems may convert input data (for example, data representing an image for two-dimensional printing, or data representing an object for three dimensional printing) to print instructions, which specify where print materials (for example, colorants such as inks, toners or other printable materials) are to be placed in a print operation.

Techniques used in converting data include use of halftone screens. In some examples, halftone screens are implemented as arrays, or matrices, of threshold values, which correspond to pixels in the input data. Values associated with pixels in the input data are compared to at least one threshold for that pixel and print material may be deposited (or not deposited) based on the comparison. Examples of halftone screens include amplitude modulation halftone screens, in which a size of an applied dot or spot may be varied, and frequency modulation halftone screens, in which a number of applied dots or spots may be varied.

BRIEF DESCRIPTION OF DRAWINGS

For a more complete understanding, reference is now made to the following description taken in conjunction with the accompanying drawings in which.

DETAILED DESCRIPTION

In the case of two-dimensional printing, a print addressable location may comprise at least one pixel, and each print addressable location may be printed with at least one colorant such as inks (for example cyan, magenta, yellow and black inks), coatings or other print materials, as well as combinations of those print materials.

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may comprise at least one voxel and each voxel may be 'printed' i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent which absorbs energy onto a layer of the build material. Energy may be applied to the layer and the build material on which an agent has been applied may coalesce and solidify upon cooling. In other examples, directed energy may be used to selectively cause coalescence of build material, or binding agents may be used to selectively solidify a build material.

Some processes that print three-dimensional objects use control data or print instructions generated from a model of a three-dimensional object. This control data may, for example, specify the locations at which to apply an agent to the build material, or where a build material itself may be placed, and the amounts to be placed. Halftone screens may be used to determine where to place drops of agents (for example, the energy absorbing agent, binding agent and/or colorants).

In examples of halftone screens, it may be intended to avoid patterns associated with the screen appearing in the printed output. For example, a 'moiré' pattern may be seen where clusters of dots repeat or, in the case of printing multiple colors (which may be printed in separate layers, or 'separations'), dots from one color may visually interfere with dots printed in another color. Such patterns may be seen to detract from image quality. Halftone screens may be designed to avoid such patterns appearing in printed outputs, or to minimise their occurrence or impact. However, in examples herein, halftone screens may be designed to deliberately include a pattern, for example such that a 'signature' pattern may be discernible in the printed output. In some examples, this pattern may be suitable for validating an origin of the printed output.

Figure 1:
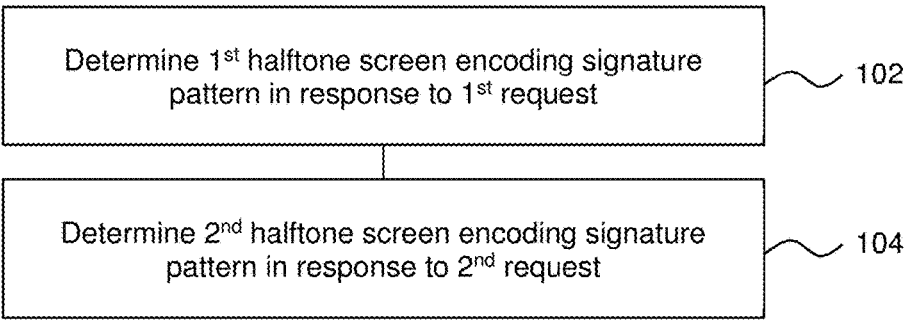
FIG. 1 is a flowchart of an example of a method of determining halftone screens encoding signature patterns.

FIG. 1 shows a flow chart of an example, which may be a computer implemented method and may be a method of determining halftone screens encoding signature patterns. This may for example provide a means to validate a source of a printed output which is printed using print instructions generated using a particular halftone screen (i.e. a halftone screen encoding a particular pattern).

The method comprises, in block 102, by at least one processor, and in response to a first request, determining a first halftone screen encoding a signature pattern.

Block 104 comprises, in response to a second request, determining a second halftone screen encoding a signature pattern which is different from that encoded in the first halftone screen. The halftone screens are arranged, derived or configured such that, when used to process image data to provide print instructions for generating a printed output, the pattern is discernible in the printed output to provide a signature for the printed output. This may in practice be achieved by distributing threshold values of the screen according to the signature pattern. For example, the halftone screen may comprise areas which are likely to result in voids in the printed output. This may be achieved by having areas in the halftone screen with consistently high threshold values (assuming that, in halftoning, print agent is deposited when a pixel value in image data exceeds a threshold value of a corresponding pixel in the halftone screen).

For example, using such a screen, an image may be embedded with lines or dots, or regions of higher and lower amounts of print agent which is added to the image data via the halftone screen to provide a discernible pattern. The signature pattern may be discernible therein, for example by visual inspection (which may in some examples be a naked eye visual inspection or a magnified visual inspection). In some examples, the inspection may be carried out in light which renders the pattern visible (for example, UV light or IR light which causes a print agent to fluoresce or the like). In other examples, the inspections may be carried out using optical sensing apparatus, for example magnifying apparatus, or an inspection outside the observable frequency range of human vision, which may for example be able to detect patterns which are not discernible to the human eye.

In summary, the halftone screen for different requests may be encoded with a different signature pattern. In some examples, each request results in a halftone screen which is encoded with a signature pattern which is unique (or substantially unique) to that request. As noted above, this means that the signature may be used to validate, at least in part, a source of a printed output (or to increase a confidence that the printed output originated from the source). For example, the printed output may be inspected to determine if it includes a signature pattern corresponding to that supplied in response to a particular request. In such an example, there may be a high degree of confidence that the printed output originates from an entity which had access to that pattern. In some examples, this may be the entity which requested the halftone screen. The same halftone screen may be used to provide a signature to any number of printed outputs, which may be different from one another (for example, showing different images), but can have the same signature.

Therefore, the signature pattern may provide a security feature which is embedded in a printed output. In some examples, the signature pattern may be associated with a particular entity and/or print apparatus to which it was transmitted.

In some examples, the method may comprise preventing the same pattern from being encoded in screens sent in response to different requests. For example, determining the halftone screen may comprise selecting a predetermined halftone screen from a plurality of predetermined halftone screens, or selecting a predetermined signature pattern from a plurality of predetermined signature patterns. In such an example, the method may further comprise preventing, using at least one processor, the selection of a previously selected halftone screen/signature pattern in response to a subsequent request. For example, the halftone screen/signature pattern may be deleted from a list, or the index thereof may be changed to render it unselectable once it has been selected once.

In another example, determining the halftone screen comprises generating a pattern on a deterministic basis. For example, the pattern may be a geometric pattern having at least one configurable parameter (e.g. a separation of pattern elements, a dimension or relative dimension within the pattern, a shape of at least one pattern element or the like). In such an example, the method may further comprise preventing, using at least one processor, the determination of that halftone screen in response to a subsequent request. For example, a combination of parameters may be prevented from being repeated.

In other examples, there may be a large number of possible patterns/screens such that selection of the same screen is sufficiently rare to avoid a security concern associated with re-selection of the same screen.

In some examples, the signature may comprise an 'error', or inconsistency, in an otherwise regular pattern. For example, a pattern may comprise a concentric arrangement of rings made up of pattern elements comprising smaller circles, and one of the rings—the $n^{th}$ largest, for example—may be missing a circle in an otherwise regular spacing of circles. In other examples, features such as the number of rings/circles, the separation of the rings/circles, the size of the rings/circles or the like may, individually or in combination, provide the signature.

In some examples, the halftone screens/patterns may be stored and/or determined in a secure manner, or a tamper evident manner. In some examples, a halftone screen determined in response to a request may be transmitted to a requesting entity or some other entity (for example, an entity identified in the request) securely, for example having been encrypted.

In some examples, halftone screens may be generated in advance of a print job, and provided to a printer (for example, a printer of the requesting entity) as a 'ready to use' halftone screen. As such screens are used by printers in converting image data into a print-ready format, this does not result in a change to the workflow of the printer. In some examples, the halftone screens may be defined at a resolution which is higher than the intended print resolution. For example, while the print resolution may be around 800 dpi, a halftone screen may be defined at around 2400 dpi. This relatively higher resolution may allow the halftone thresholds to be defined to provide a reasonable number of lines per inch (Ipi), in turn allowing fine lines to be reproduced. In other examples, the relatively higher resolution may allow for amplitude and/or frequency modulation. As halftone screens may be tiled (i.e. made up of a number of replicated or repeated tiles), this may provide a relatively compact image despite the higher resolution.

Figure 2A:
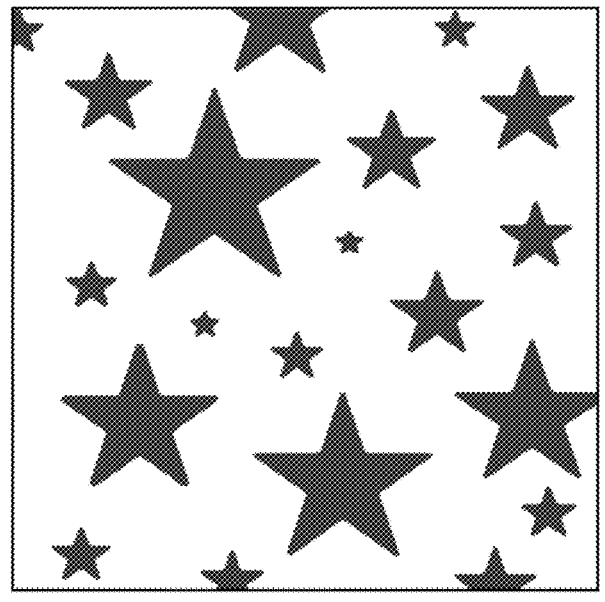
FIG. 2A shows an example of image data.
Figure 2B:
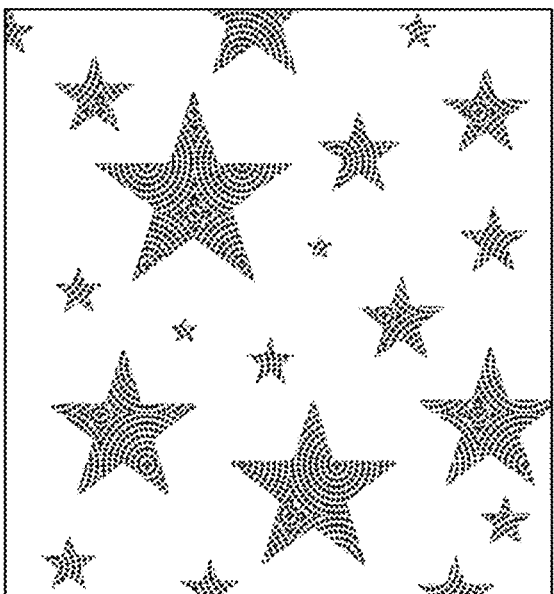
FIG. 2B shows an example of a printed output including a signature pattern.
Figures 2C, 2D, 2E, 3:
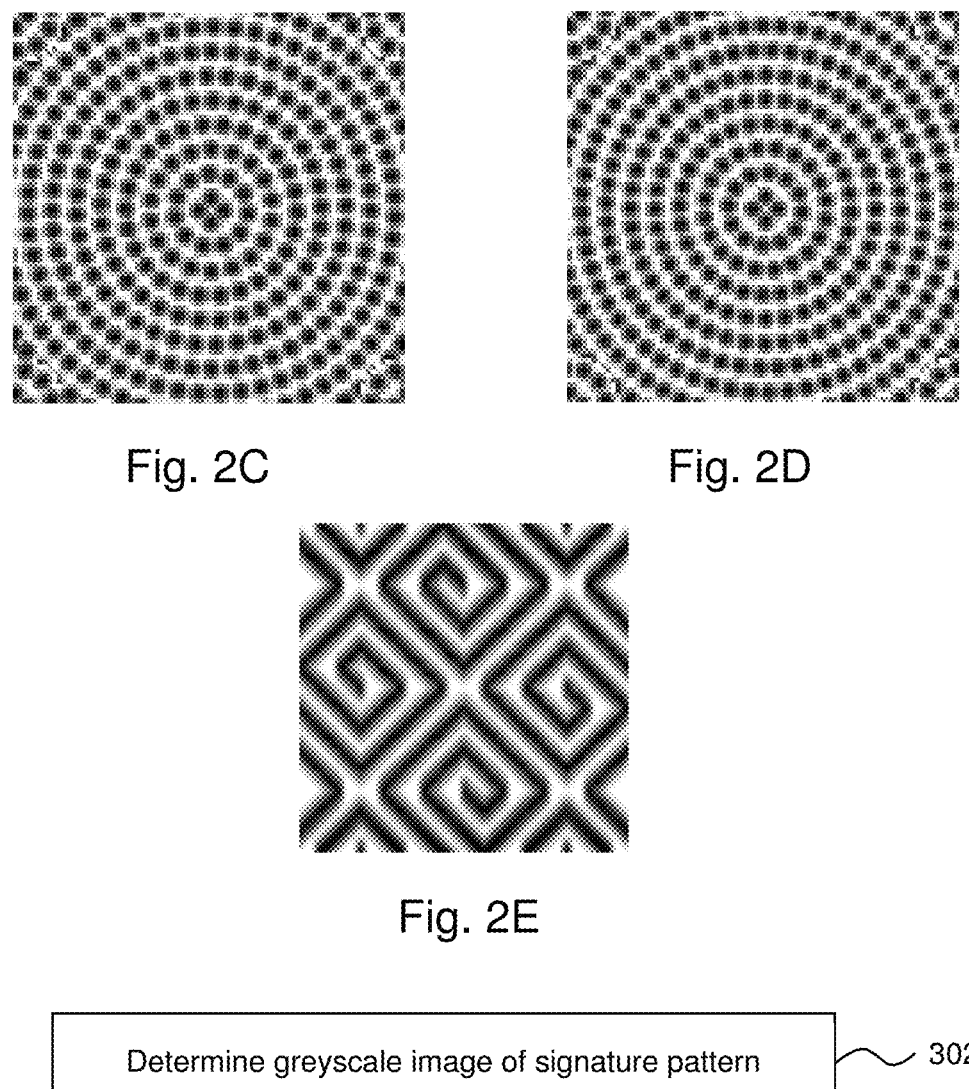
FIGS. 2C, 2D and 2E are examples of representations of halftone patterns encoding different signature patterns.
FIG. 3 is a flowchart of an example of a method of distributing a halftone screen.

FIG. 2A shows a representation of image data, which in this example describes a relatively simple image, but in other examples may for example be a more complex image. FIG. 2B shows a representation of the image having been halftoned using a halftone screen encoding a signature pattern, for example a representation of a printed output of the image. FIG. 2C shows a representation of a portion (a tile) of the halftone pattern used to generate this image. This has an array of small circles, themselves arranged in concentric rings. In this example, a high threshold value in the halftone screen is indicated as a light color and a low threshold is indicated as a darker color. In practice, this would be an array of threshold values, for example distributed between 0 and 1, or having the same value spread as pixel values in image data. In use (in a simple case—although in other examples the halftone screen may be an amplitude modulation or a frequency modulation screen), when a pixel value is compared to a threshold value, print agent may be applied to a location corresponding to the pixel if the pixel value is above the threshold and not otherwise. Therefore, low threshold (black regions) will usually be associated with placement of print agent unless there is a void in the image data at this point (for example a blank portion of the image). High thresholds (white regions) will usually be associated with voids in the printed image, whether or not a blank space is indicated in the image data). Therefore, the pattern may be encoded in the distribution of threshold values.

FIG. 2D shows a tile of a different signature pattern. While similar to that shown in FIG. 2C, it has discernible differences. In particular, attention may be drawn to the first ring from the centre, which has twelve small circles whereas the pattern in FIG. 2C has eleven small circles. This difference, while having minimal effect on how the halftoned image shown in FIG. 2B would be perceived by a user, could nevertheless provide a 'signature' for the image which was different from the signature shown embedded in the image in FIG. 2B. Thus, in this example, the 'signature' of the pattern at least includes the number of small circles in the first ring from the centre. The signature may also include other features or characteristics of the pattern which may, in combination, be associated with a particular halftone screen. For example, the number and/or separation of the concentric rings or small circles may comprise all or part of a signature, as may a diameter or one or more of the rings, or an irregularity in a ring or small circle. This may in turn allow the entity to whom the halftone screen was provided to be identified, and therefore there may be at least an initial presumption that the identified entity is the source of a printed output including the signature pattern.

FIG. 2E shows a further different signature pattern, which is based on a diamond shaped spiral. In such a pattern, the signature may for example be based on any or any combination of the tightness of the spiral, the length of the tail at the centre of the spiral, a location of break in the spiral or the like.

In other examples, shapes may be used to provide the signature. For example, array of hearts, diamonds, spades and clubs may be formed, and the arrangement of these shapes (as well as other features, such as size, or a misshapen example of one of the shapes) may provide the 'signature' for that pattern.

FIG. 3 is an example of a method of determining a halftone screen which may be implemented, at least in part, by one or more processors.

In this example, block 302 comprises determining a greyscale pattern. For example, there may be one or more features of the pattern (for example, an arrangement of a subset of dots or lines) which can be used, for example in combination, to identify the pattern (in some examples, substantially uniquely from other patterns generated according to the methods herein). For example, as described above, the pattern may comprise an irregularity, a characteristic geometry and/or a characteristic shape within a then pattern, or the like, to provide a signature for the pattern. For example, the signature pattern may comprise a relatively simple pattern, such as a geometric pattern. The signature pattern may have one or more repeating elements.

The pattern may be created in a deterministic manner, for example based on an algorithm or the like which may be seeded with a predetermined seed.

Block 304 comprises storing, in memory or the like, an indication of the pattern (which may for example be a copy of the pattern, or an identifier from which the pattern may be recreated), for later verification of a signature. The pattern is associated with an identifier which may in turn be associated with a requesting entity (and/or a specific request), such that the pattern may be identified subsequently. In some examples, the identifier may comprise a seed (or may be algorithmically related thereto) from which the pattern may be created, and therefore the indication of the pattern may comprise the identifier itself. The memory may be a secure memory and/or the indication may be stored in an encrypted manner to keep the pattern secure. In other examples, the indication of the pattern may be the halftone screen generated therefrom, as described below Block 306 provides an example of a method for determining, by at least one processor (which may be the same or a different processor to that described in relation to block 302), a halftone screen from the pattern by converting, by at least one processor, the pattern to a halftone screen comprising a matrix of threshold values.

In an example, the greyscale values of the pixel array of the greyscale image provide the halftone thresholds of the pixel array of a halftone screen directly, which is to say that the greyscale value within a greyscale converts proportionally to a halftone threshold in a halftone threshold range. In other examples, there may be some dithering of values or the like such that the conversion is less direct. In some examples, any parameters used in converting the greyscale values to halftone thresholds may be stored.

Block 308 comprises transmitting (e.g. over a network or the like) the halftone screen to an entity which may comprise a printer operator, and/or may be the entity which sent a request as described in relation to FIG. 1, or may be another entity identified in the request. In some examples, the method comprises encrypting the halftone screen prior to transmission. In other examples, the halftone screen may be distributed securely in some other way (for example, securely physically distributed on a tangible storage medium or the like).

A printer operator may (in some examples, having decrypted the data based on a shared key or the like) apply the halftone screen to image data to determine print instructions, and print an image based thereon. Applying the halftone screen to image data may comprise associating at least one pixel of the screen with a pixel of the image data, comparing an image pixel value with the threshold value of the or each halftone screen pixel, and determining print instructions (which may for example be binary and/or include a number or size of print agent dots) for each image pixel accordingly. The printed image may therefore have the signature embedded therein. In some examples, the halftone screen comprises a plurality of duplicated 'tiles', or else the print apparatus may use each halftone screen in a tiled manner.

In some examples, halftone screens may be applied in a plurality of color planes (e.g. CMYK color planes). However, the signature may not be present in all color planes and may nevertheless be detectable in some instances. It may be noted that, in some examples, a relative rotation may be applied to a particular halftone screen when using the halftone screen for multiple color planes to avoid moiré effects. In such cases, if the pattern is such that a relative rotation would mean the pattern is offset in the different color plane (and it is intended that the pattern should be aligned in all planes), then the digital image planes may be rotated prior to halftoning, then rotated back prior to printing.

A print apparatus may for example comprise print apparatus components such as print head(s), at least one print agent supply, and the like. Where the print apparatus is a 'two dimensional' printer, it may for example comprise a laser printer or an inkjet printer or the like, and may comprise a print head, substrate handling system, sources of inks or toner, and the like. Where the printer is a 'three dimensional' printer, it may comprise, or be associated with, a print bed, a fabrication chamber, a print head, at least one energy source, a source of build material, or the like.

Figure 4:
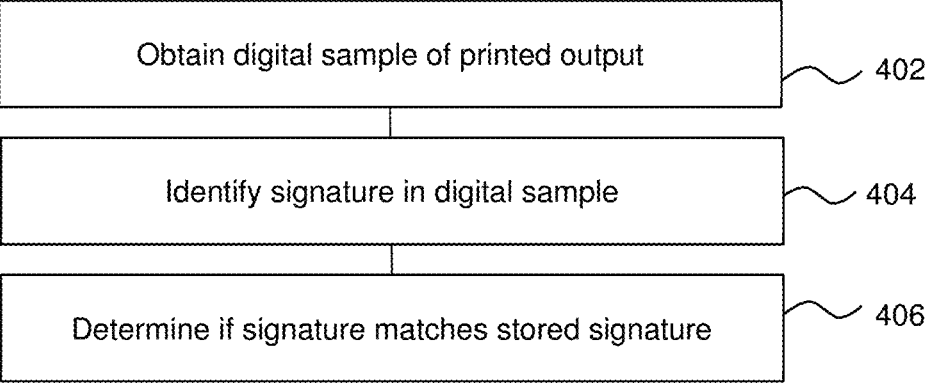
FIGS. 4 and 5 are example methods of determining if a signature is included in a printed image.

FIG. 4 is an example of a method, which may comprise a computer implemented method of verifying a signature within a printed image. In some examples, the method of FIG. 4 may be carried out by a processing apparatus having access to a stored database of patterns associated with identifiers, the identifiers being associated with requesting entities. The database may be a secure database, for example having restricted access.

Block 402 comprises obtaining, by processing circuitry, a digital sample of a printed output. For example, the printed output may be scanned or digitally photographed to provide the digital sample. In some examples, the image may be captured using a camera of a mobile telephone. This may comprise imaging a region of the image corresponding to a plurality of halftone 'tiles', as, for example due to light portions or voids in the halftoned image data, each tile may not itself provide the full pattern. The number of tiles in a digital sample may depend on a number of factors, including the content of the printed output and convenience of capturing the number of tiles.

Block 404 comprises identifying, by processing circuitry, a signature in the digital sample. For example, this may comprise determining whether the printed image comprises a halftone signature. The halftone signature may be a signature introduced using a halftone screen having a signature pattern. For example, this may comprise comparing one or more stored signatures to the image to identify a matching signature. In some examples, an indication of an expected matching signature maybe provided (e.g. a purported origin of the image). In some examples, a pattern may be extracted from the digital sample. In some examples, the extraction maybe performed with input from a user. In other examples, machine learning techniques may be used to derive a model for extracting patterns from digital samples, for example having been 'trained' using a plurality of printed halftoned images and their respective signature patterns to discern how features of the pattern may be represented in the printed output. The method of extraction may, in some examples, account for randomization which is introduced during the printing process, for example the exact position of a printed dot may vary systematically (e.g. due to the printing apparatus, printheads or software used) and randomly (e.g. due to environmental conditions and tolerances of printing apparatus). Therefore, the extraction may allow for small variations in expected positions of ink dots when extracting a pattern. For example, an estimate of where a print instruction indicated that a dot of ink should be placed may be derived, but may be associated with an uncertainty based on the randomizations which may be encountered during printing.

Block 406 comprises determining if the signature is a stored signature associated with an entity. In some examples, the match may be a 'fuzzy' match, for example taking into account for randomization which is introduced during the printing process, as discussed above. In some examples, therefore, the randomisation may be taken into account in block 404 and/or in block 408. For example an expected signature may be compared to the digital sample, and if the digital sample corresponds sufficiently closely with the expected signature, then it may be determined that the digital sample comprises the expected signature. In some examples, a model trained using machine learning techniques as described above may be employed to determine if the match is sufficiently close.

This determination may in turn have different implications depending on the context. For example, in the event of a negative determination, it may indicate that the printed image is a fraudulent image, or that further validation is indicated. In some examples, if the comparison is inconclusive, a new digital sample may be requested. In the event of a match to a stored signature, this may in turn imply validation of the content of the printed page, which may for example comprise something of value (e.g. a voucher having a monetary worth, or a ticket or the like), or a technical content which may be relied upon.

Figure 5:
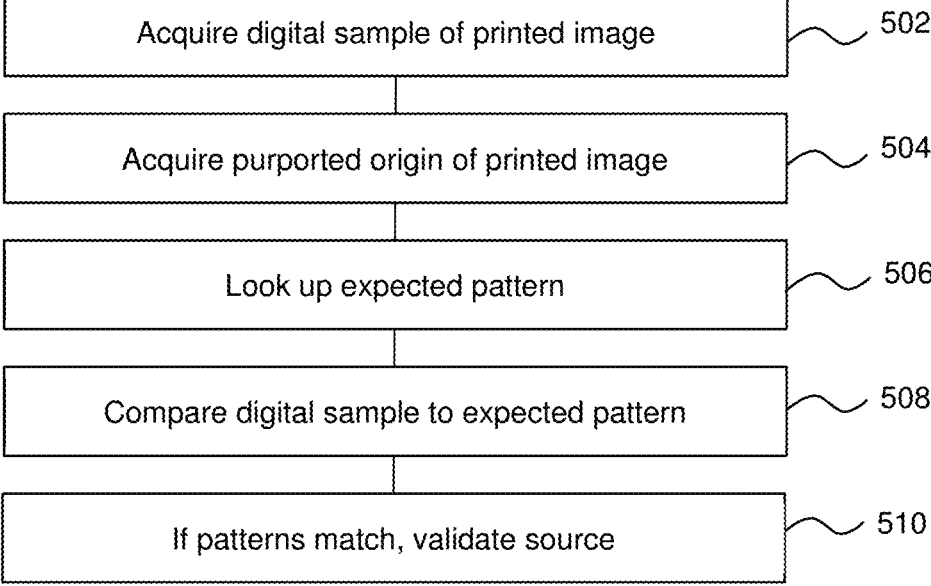

FIG. 5 is an example of a method, which may comprise another computer implemented method of verifying a signature within a printed image.

In this example, a digital sample of the printed image is obtained by processing circuitry in block 502, for example as described in relation to block 402 above.

In addition, in this example, a purported origin of the image is also acquired by the processing circuitry in block 504. For example, this may comprise an entity which is purported to have printed the image (e.g. HP Indigo), and/or may comprise an indication of a specific printing apparatus.

The purported origin is used, in block 506, to look up the expected pattern(s) for that entity/additive manufacturing apparatus. In some examples, this may comprise accessing a stored greyscale image of the pattern, accessing an algorithmic representation of the pattern, or accessing the halftone screen. In other examples, the method may comprise looking up an indication of the 'signature' rather than the pattern itself. For example, the 'signature' may comprise some combination of features (such as separation of pattern features, irregularity, combination of shapes within the pattern or the like).

Block 508 comprises comparing the expected pattern with the digital sample. This may for example comprise looking for matching features and/or inconsistencies between the printed images and the pattern. As noted above, the match may be a 'fuzzy' match.

Block 510 comprises validating a source of the image if the printed image comprises the expected halftone signature, wherein the halftone signature may be a signature introduced using a halftone screen having a signature pattern. In other words, an assessment may be made as to whether the patterns match, suggesting that the purported origin is the true origin, or do not, suggesting that the purported origin is incorrect. In other examples, rather than comparing patterns, an image processing algorithm may be used to identify the 'signature' in the digital sample. In some examples, if a signature is not represented in the printed image, then it may be determined that the patterns do not match.

While in this example the purported origin was acquired, this may not be the case in all examples. In some examples, the digital sample may be processed by image processing circuitry to determine characteristics of the pattern, and thereby identify a possible signature within that pattern. This may comprise assessing a region of a digital sample corresponding to a plurality of halftone tiles, as, for example due to light portions or voids in the image data, each tile may not itself provide the full pattern.

Figure 6:
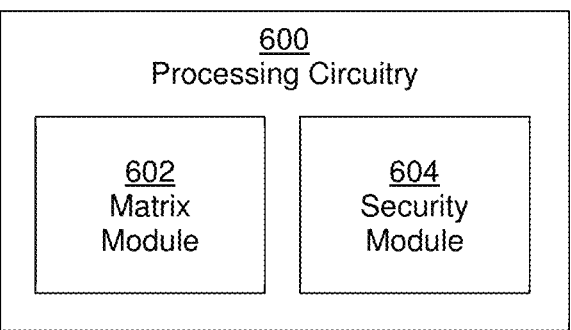
FIGS. 6 and 7 are simplified schematic drawings of example processing circuitry.

FIG. 6 is an example of processing circuitry 600 comprising a matrix module 602 and a security module 604.

The matrix module 602 is, in use of the processing circuitry 600, to determine a halftone threshold matrix encoding a signature pattern in response to a request from a requesting entity, where the determined halftone threshold matrix is to be provided to the requesting entity. The threshold matrix may have any of the attributes of a halftone screen described above.

The security module 604 is, in use of the processing circuitry 600, to prevent the same signature pattern from being encoded into a plurality of threshold matrices and provided to another (different) requesting entity. This allows the signature to provide a security feature in a printed output, for example being to verify and/or authenticate a source of the printed output as described above. In some examples, the security module 604 may securely store an indication of the pattern, and/or may for example encrypt the halftone screen prior to its distribution.

Figure 7:
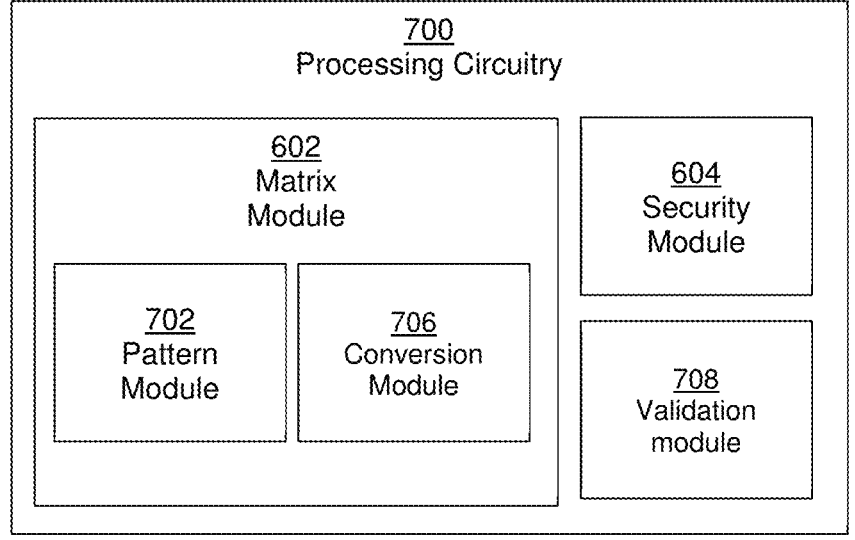

FIG. 7 is an example of processing circuitry 700 comprising the matrix module 602 and the security module 604 described in relation to FIG. 6. In this example, the matrix module 602 further comprises a pattern module 702, a conversion module 704, and the processing circuitry 700 further comprises a validation module 706.

The pattern module 702 is, in use of the processing circuitry 700, to determine a greyscale pattern, for example having a repeated (e.g. tiled) pattern of dots or lines or the like. For example, the pattern module 702 may carry out block 302 of FIG. 3.

The conversion module 704 is, in use of the processing circuitry 700, to convert the greyscale values to thresholds in a halftone screen. For example, the conversion module 704 may carry out block 304 of FIG. 3.

The validation module 706 is, in use of the processing circuitry 700, to validate a digital sample of a printed image. For example, the validation module 706 may carry out any or any combination of the blocks of FIG. 4 or 5.

While in this example the same processing circuitry which provides the halftone screens also provides validation, it will be understood that in some examples these processes may be separate from one another Examples in the present disclosure can be provided as methods, systems or machine readable instructions, such as any combination of software, hardware, firmware or the like. Such machine readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, or a module thereof, may execute the machine readable instructions. Thus functional modules of the processing circuitry 600, 700 (for example, any of the matrix module 602, the security module 604, the pattern module 702, the conversion module 704 and the validation module 706) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising, by at least one processor:
in response to each of a plurality of requests, determining a halftone screen, wherein determining the halftone screen comprises encoding one unpartitioned signature pattern into the halftone screen, and halftone screens for different requests are encoded with a different one unpartitioned signature pattern; and
applying the halftone screen to image data, the halftone screen being arranged such that, when applied to the image data to provide a printed output, the one unpartitioned signature pattern is discernible therein to provide a signature for the printed output, wherein applying the halftone screen to the image data includes:
associating a pixel of the halftone screen with a pixel of the image data, comparing a pixel value of the image data with a threshold value of the pixel of the halftone screen, and
determining print instructions for the pixel of image data based on a result of the comparison.

2. A method according to claim 1 further comprising transmitting the halftone screen to an entity identified in the request.

3. A method according to claim 2 further comprising encrypting the halftone screen and transmitting the encrypted halftone screen.

4. A method according to claim 2 further comprising: storing an indication of each one unpartitioned signature pattern in association with an identity of each entity to which the halftone screen was transmitted.

5. A method according to claim 4 wherein storing the indication of each one unpartitioned signature pattern comprises securely storing the indication.

6. A method according to claim 4 further comprising:

obtaining a digital sample of the printed output;

identifying the one unpartitioned signature pattern in the digital sample; and determining that the one unpartitioned signature pattern is a stored signature associated with an entity.

7. A method according to claim 1, wherein the halftone screen includes a matrix of threshold values that corresponds to the one unpartitioned signature pattern.

8. The method of claim 1, wherein the one unpartitioned signature pattern includes an encoded pattern of dots or lines.

9. The method of claim 1, wherein the one unpartitioned signature pattern includes one or more predetermined shapes.

10. The method of claim 1, wherein the one unpartitioned signature pattern includes an inconsistency in an otherwise regular pattern.

11. The method of claim 1, wherein the one unpartitioned signature pattern includes a predetermined grayscale pattern.

12. The method of claim 1, wherein the one unpartitioned signature pattern includes an irregular pattern.

13. The method of claim 1, wherein the one unpartitioned signature pattern includes a geometric pattern.

14. A method comprising, by at least one processor:

in response to each of a plurality of requests, determining a halftone screen, wherein determining the halftone screen comprises encoding a signature pattern into the halftone screen, and halftone screens for different requests are encoded with a different signature pattern; and applying the halftone screen to image data, the halftone screen arranged such that, when applied to the image data to provide a printed output, the pattern is discernible therein to provide a signature for the printed output; and preventing selection of the halftone screen or signature pattern in response to a subsequent request.

15. The method of claim 14, wherein determining the halftone screen comprises:

selecting the halftone screen from a plurality of predetermined halftone screens; and selecting the signature pattern from a plurality of predetermined signature patterns.

16. The method of claim 14, wherein determining the halftone screen comprises generating a pattern on a deterministic basis.

17. The method of claim 14, further comprising: storing an indication of the signature in association with an identity of an entity to which the halftone screen was transmitted.

18. The method of claim 14, wherein applying the halftone screen to the image data includes:

associating a pixel of the halftone screen with a pixel of the image data, comparing a pixel value of the image data with a threshold value of the pixel of the halftone screen, and determining print instructions for the pixel of image data based on a result of the comparison.

* * * * *